March 10, 1931.    H. A. KESSLER    1,795,493
PRODUCTION OF EXPANDED METAL
Filed March 10, 1927    7 Sheets-Sheet 1

Inventor
HARRY A. KESSLER

Attorneys

March 10, 1931. H. A. KESSLER 1,795,493
PRODUCTION OF EXPANDED METAL
Filed March 10, 1927 7 Sheets-Sheet 2

Inventor
HARRY A. KESSLER
By
Popp and Powrs
Attorneys

March 10, 1931. H. A. KESSLER 1,795,493
PRODUCTION OF EXPANDED METAL
Filed March 10, 1927 7 Sheets—Sheet 3

Inventor
HARRY A. KESSLER
By Popp and Powers
Attorneys

March 10, 1931.   H. A. KESSLER   1,795,493
PRODUCTION OF EXPANDED METAL
Filed March 10, 1927   7 Sheets-Sheet 5

Inventor
HARRY A. KESSLER
By Popp and Powers
Attorneys

March 10, 1931. H. A. KESSLER 1,795,493
PRODUCTION OF EXPANDED METAL
Filed March 10, 1927  7 Sheets-Sheet 7

INVENTOR
HARRY A. KESSLER

Patented Mar. 10, 1931

1,795,493

UNITED STATES PATENT OFFICE

HARRY A. KESSLER, OF BUFFALO, NEW YORK, ASSIGNOR TO KALMAN STEEL COMPANY, INC., OF CHICAGO, ILLINOIS, A CORPORATION OF DELAWARE

PRODUCTION OF EXPANDED METAL

Application filed March 10, 1927. Serial No. 174,197.

This invention relates to the production of expanded metal and proposes a method which is herein illustrated and described in connection with the manufacture of lath but which is available for the manufacture of other products for use in structural operations.

The principal object of the invention is to provide a simple, practicable and economical method of expanding metal wherein the expansion is accomplished without any shortening of the expanded product relative to the blank with which the operation is started and whereby there is obtained a product of superior quality, characterized by flat strands and bonds lying in a common plane.

Equipment for practicing the invention is illustrated in the accompanying drawings in which:

Figures 1 and 1a are plan views, part of the equipment being shown in Figure 1 and the remainder in Figure 1a.

The invention is herein shown in connection with the manufacture of ribbed lath and the equipment illustrated consists generally of instrumentalities as follows and which operate in the order enumerated, namely, beading rolls, slitting rolls, expansion rolls, ribbing rolls, an expansion guide and finishing rolls. The method is characterized by the stretching of the strands which are delimited by the slits and, in the case of lath, may be practiced with either a hot or cold blank. A heated blank is preferably used and a furnace for heating the blank may be arranged between the slitting rolls and the first pair of expansion rolls.

Figure 1:
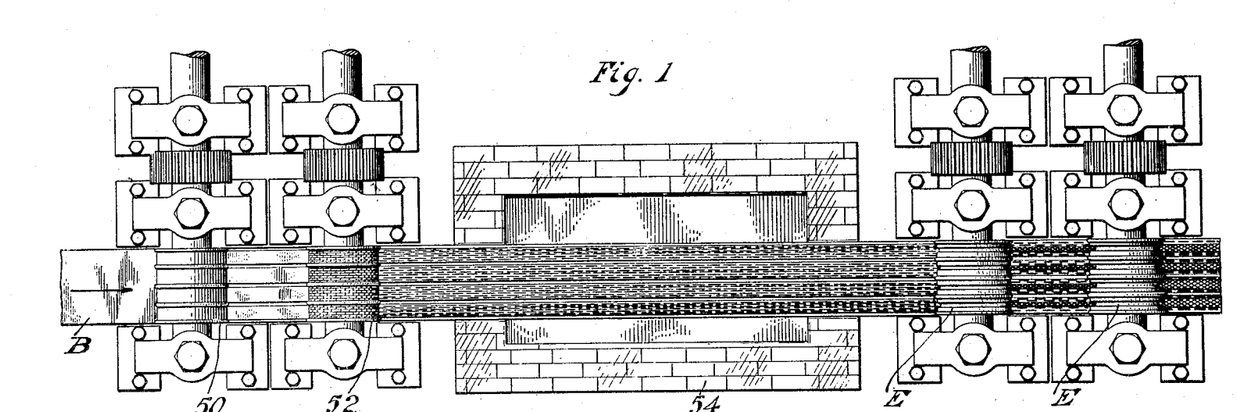
Figures 24, 25, 26, 27, 28, 29, 30:
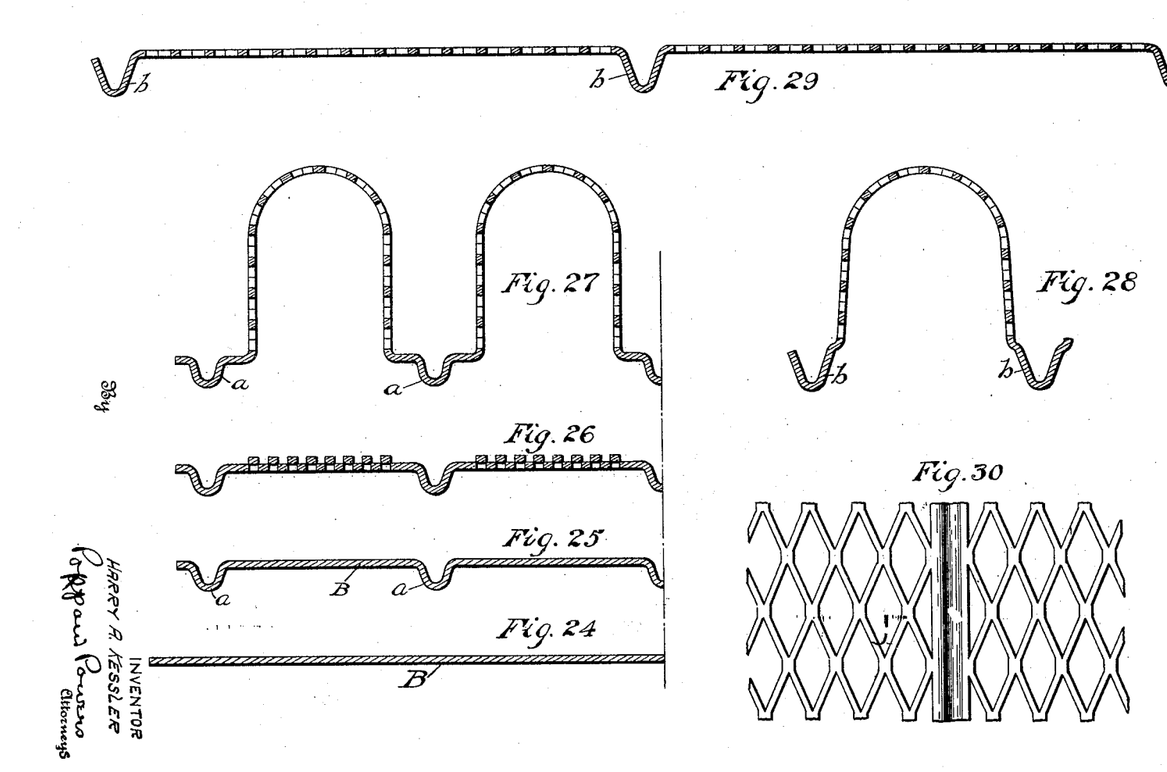
Figure 24 is a partial cross section of the blank with which the operation starts.
Figure 25 is a similar view immediately after the beading operation.
Figure 26 is a similar view immediately after the slitting operation.
Figure 27 is a similar view after the operation of the final pair of expansion rolls.
Figure 28 is a similar view after the operation of the ribbing rolls.
Figure 29 is a similar view of the finished product.
Figure 30 is a plan view of the finished product.

As applied to lath the process is started with a blank B in the form of a flat sheet of suitable width which is shown in Figures 1 and 24. As herein shown this blank is first operated on by the beading rolls 50 and 51 which form therein the beads $a$ (Figure 25). From the beading rolls the blank passes to the slitting rolls 52 and 53. In the case of lath these may be rolls having the usual shearing cutters. The rolls 52 and 53 form the blank with any desired number of rows of slits (Figure 26) by which the parts which provide the strands and bonds of the finished product are delimited, the arrangement of the slits being selected with reference to the form of mesh desired, diamond mesh being preferred. If the expanding operations are to be practiced with a heated blank, as preferred, the blank on leaving the slitting rolls passes through a suitable furnace 54 by which it is heated to about 1600° F.

From the furnace 54, or from the slitting rolls in case the furnace is not employed, the blank passes to the expansion rolls. In the case of lath the expansion rolls are provided in cooperating pairs that act successively in stretching and expanding successive rows of strands.

According to the invention the blank is expanded between portions lying at each side of a slitted zone, such portions in the present instance being the non-slitted portions in which the beads $a$ are formed; and the expansion is effected by stretching locally in a single operation each longitudinal row of strands while holding the bonds between which the strands extend, the strands being displaced from the original plane of the blank and stretched in the directions of their length and in the planes which they assume in consequence of their displacement while the bonds are so held as to lie within and form parts of a regular curve uniform in all cross sectional planes of the parts affected by the stretching operation. In the case of lath the strands are stretched in successive rows and since each row of strands is completely stretched in a single local operation the strands which have been previously stretched are held against further stretching during subsequent operations. The manner of stretching the strands and holding the bonds results in a cross sectional formation of the stretched areas such that by a subsequent spreading or fanning-out operation they may be uniformly flattened and brought back into the same plane with which the operation started, the stretched strands and bonds lying flat in such plane. The expanding operation preferably proceeds from the center of the slitted zone outward and two rows of strands, one at each side of the center may be stretched simultaneously. As herein shown the strand stretching operations immediately succeed one another and as a complete series of steps are followed by the spreading or fanning-out operation, but this arrangement may be varied by alternating spreading or fanning-out steps with the strand stretching steps. The number of pairs of cooperaitng expansion rolls obviously depends on the number of rows of slits in each slitted zone. The several pairs of expansion rolls shown in the drawings bear no regard to any particular number of slits but are for the purpose of showing comparatively the successive stretching actions.

Figure 1A:
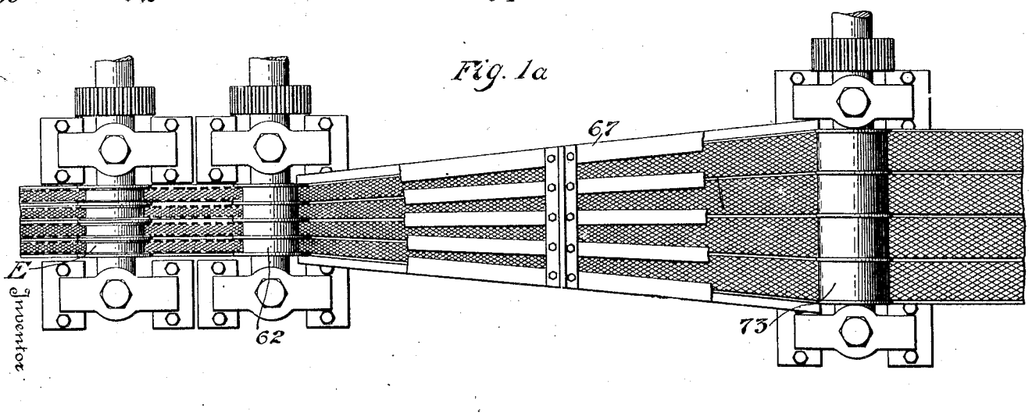
Figure 2:
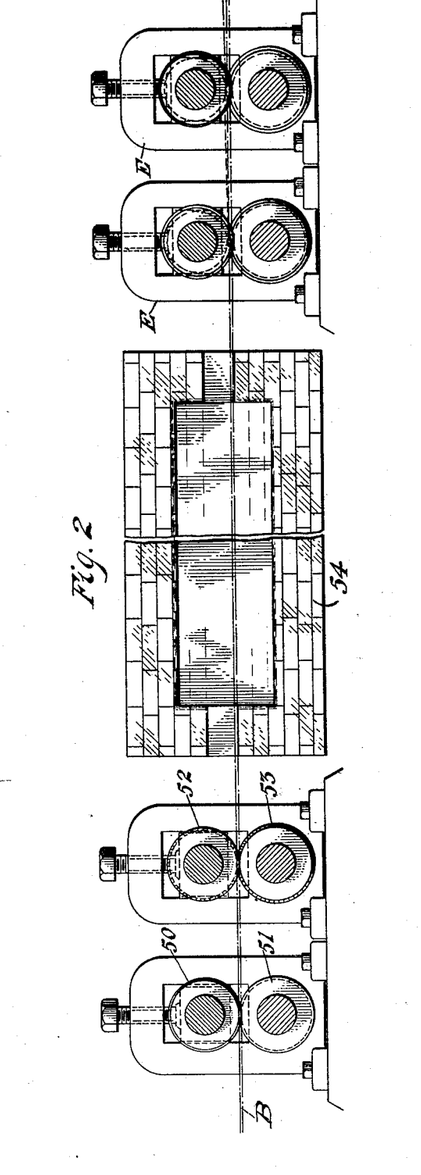
Figures 2 and 2a are vertical sectional views corresponding to Figures 1 and 1a respectively.
Figure 2A:
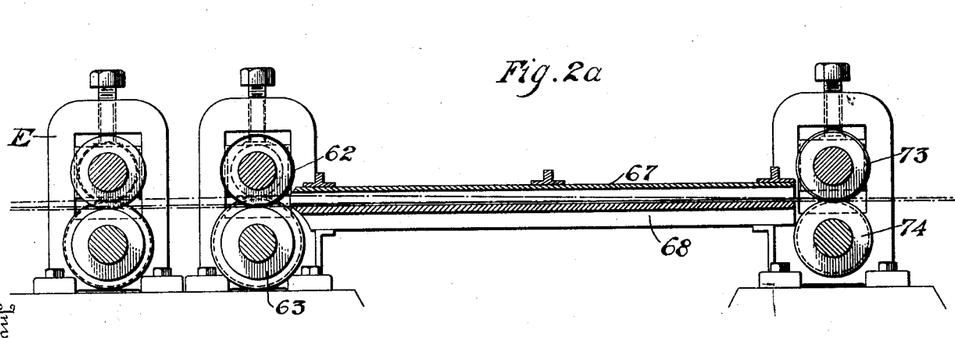
Figure 3:
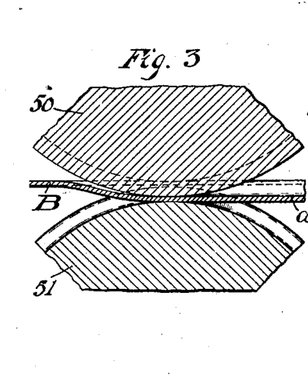
Figure 3 is a detail sectional view showing the action of the beading rolls.
Figure 4:
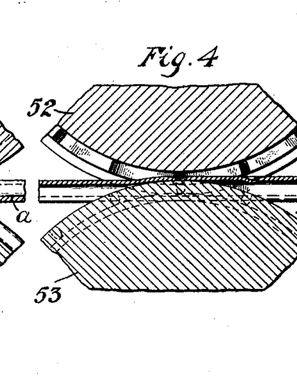
Figure 4 is a detail sectional view showing the action of the slitting rolls.
Figure 5:
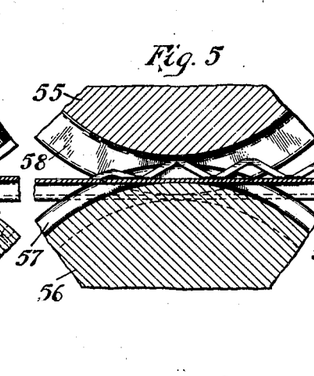
Figures 5, 6, 7 and 8 are detail sectional views showing the action of the successive expanding rolls.
Figure 6:
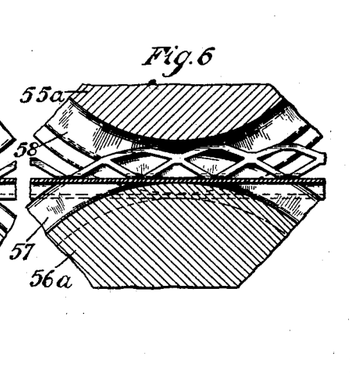
Figure 7:
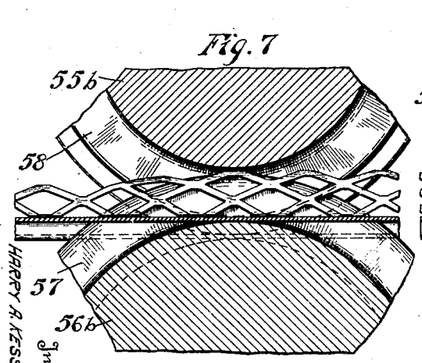
Figures 8, 9:
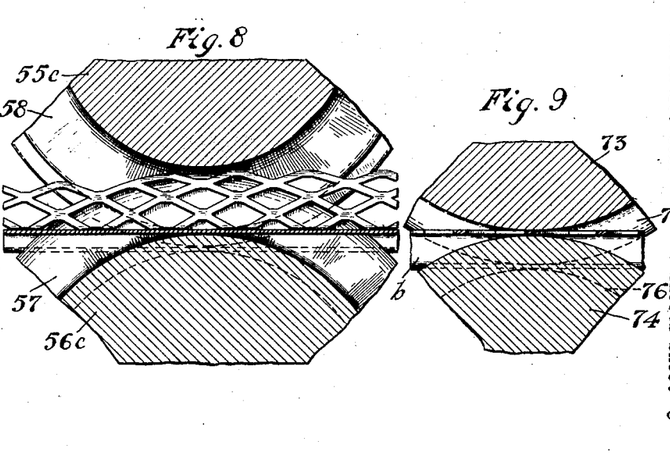
Figure 9 is a detail sectional view showing the action of the finishing rolls.

The expansion rolls are designated generally as E and three pairs of such rolls are shown in Figures 1 and 1a, the two pairs indicated in Figure 1 being the first two pairs of the series and the pair indicated in Figure 1a being the last pair of the series, it being understood that a number of pairs of such rolls, depending on the number of rows of slits, may be arranged between the last pair shown in Figure 1 and the pair shown in Figure 1a. Figure 5 shows the operation of the first pair of expansion rolls and Figures 6, 7 and 8 show the operations of the next three pairs, the operations of which and of all succeeding rolls are progressive and similar.

Figure 10:
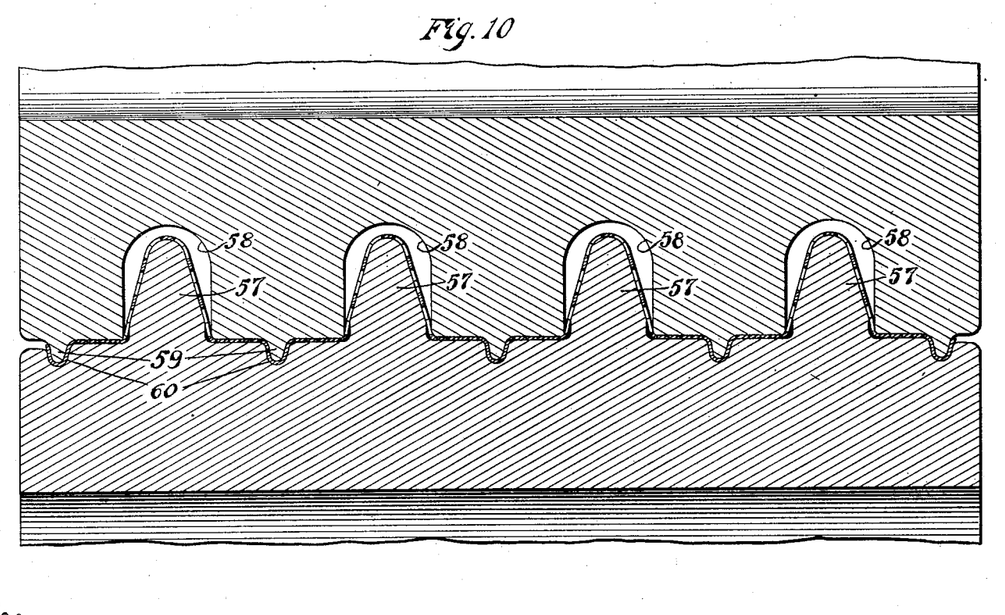
Figure 10 is an enlarged cross sectional view showing a pair of cooperating expansion rolls, the other expansion rolls being similar in their principle of construction and mode of operation.

The upper rolls shown in Figures 5 to 8 inclusive are designated 55, 55a, 55b, and 55c and the lower rolls are designated 56, 56a, 56b, and 56c. One roll of each pair, in this instance the lower roll, is formed with peripheral expansion ribs 57 corresponding in number to the number of slitted zones (Figure 10) and the other roll is formed with peripheral grooves 58 in which the ribs 57 operate, the walls of each groove being preferably so spaced from the corresponding rib as to be entirely out of contact with the blank. In all cases the rolls are formed to guide the blank and hold against lateral pull all parts which are not engaged by the expansion ribs. Thus one of the rolls, in this instance each upper roll, is provided with peripheral guide ribs 59 and the other roll is provided with corresponding peripheral grooves 60. The beads $a$ of the blank enter the grooves 60 and while in said grooves are engaged by the ribs 59 and the portions of the slitted zones which are not being engaged by the expansion ribs are engaged and held against lateral play by the cylindrical surfaces of the rolls. The expansion ribs in all cases are regularly transversely curved along their peripheries and have uniform contact with all strands which have been stretched in preceding operations whereby they operate to stretch only the outermost rows of strands lying at each side within the corresponding grooves 58.

Figure 11:
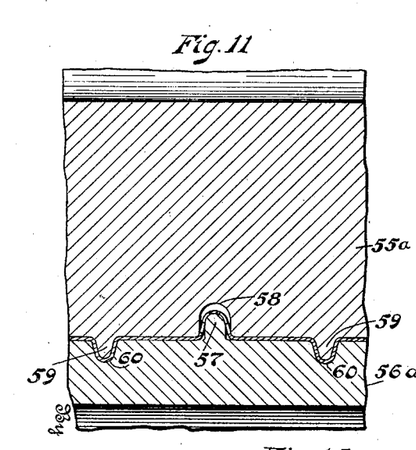
Figures 11, 12 and 13 are detail fragmentary cross sectional views showing certain of the expansion rolls.
Figure 12:
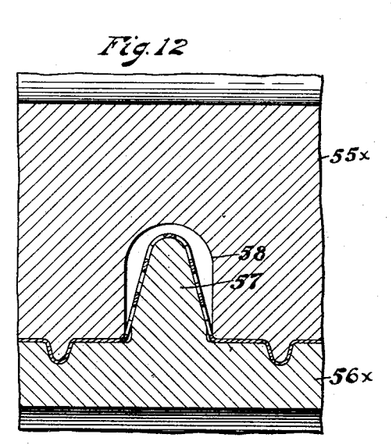
Figure 13:
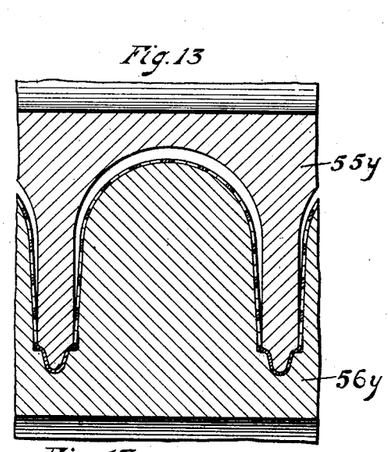
Figures 14, 15:
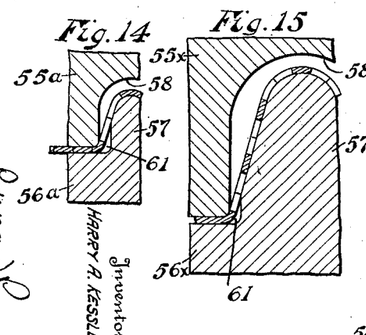
Figures 14, 15 and 16 are fragmentary sectional views suitably exaggerated to show the stretching operations involved in the expansion as affected by the rolls shown in Figures 11, 12 and 13.
Figure 16:
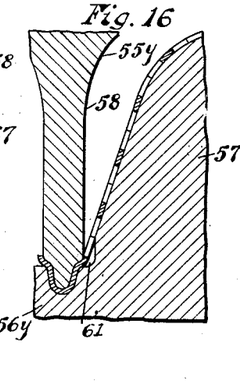

In the case of lath the slitting is such as to provide a row of bonds along the longitudinal center of the slitted zone. The rib 57 of the roll 56 (Figure 5) engages the bonds of such central row and presses them from the plane of the blank, thereby to pull the strands of the adjacent rows into planes at an angle to one another and to the plane of the blank, with the strands of each row extending diagonally and lying flat in the inclined plane, and to stretch them in the directions of their length and their common inclined plane, the stretching taking place between the rows of bonds which are engaged by said ribs and the next rows of bonds at each side which are engaged and held against lateral pull by the marginal portions of the cylindrical surfaces of the rolls. In the rolls of the next pair (Figures 6 and 11) the expansion ribs 57 are deeper and wider whereby the bonds which were engaged by the expansion ribs of the roll 56, the strands which were stretched by said expansion ribs and the bonds at the remote ends of the stretched strands lie in contact with the crown portions of the expansion ribs and, without being further stretched (this being prevented by such contact) are further deflected beyond the plane of the blank by an increment such that the deflection is extended to the strands of the next two rows, one at each side of the expansion rib. Each rib 57 of the roll 56a is formed below its crown portion which contacts with the parts specified with straight sides whereby clearances 61 (see Figure 14 which is drawn to exaggerated scale) are provided in which the strands of the two rows to which the deflection is extended are stretched in the manner above described. In like manner each expansion rib of each succeeding pair has a crown portion regularly transversely curved in its central part and of sufficiently increased depth and area to effect a further increment of deflection of the previously stretched strands and their associated bonds without further stretching thereof; and below said crown portion has its sides formed to provide the clearances 61 in which the strands to which the deflection is extended, that is to say the strands of the next outermost rows, are stretched in the manner described. The increase in the areas of the crown portions of successive rolls whereby the deflection of the stretched strands proceeds by increments and in each case is extended to the strands of the rows next adjacent the expanded area and whereby such deflected strands are also stretched in the clearances 61 is well illustrated in Figures 12 and 16. Figure 12 shows rolls 55x and 56x operating at a central stage, more or less, in the series and Figure 13 shows rolls 55y and 56y which stretch the strands of the last rows, these rolls being the pair indicated in Figure 1a. Figure 15 shows on an exaggerated scale the action of the rolls of Figure 12 and Figure 16 similarly shows the action of the rolls of Figure 13.

Figure 17:
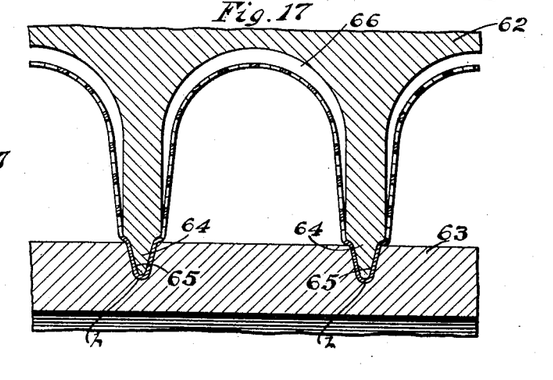
Figure 17 is a detail fragmentary cross sectional view of the ribbing rolls.
Figure 18:
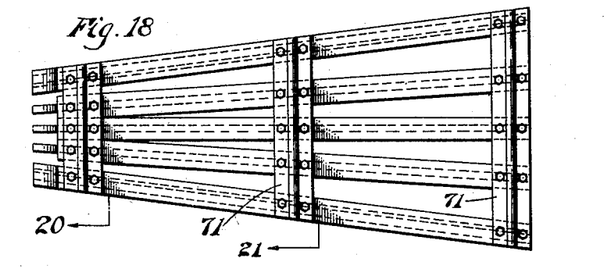
Figure 18 is a plan view of the expansion guide.
Figure 19:
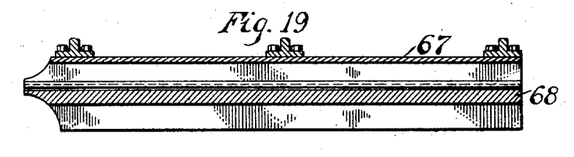
Figure 19 is a central longitudinal view thereof.
Figure 20:
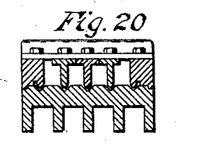
Figures 20 and 21 are cross sections in the planes indicated by the lines 20 and 21 of Figure 18.
Figure 21:
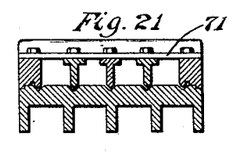
Figure 22:
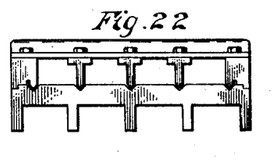
Figure 22 is an elevation of the expansion guide viewed from the larger end thereof.
Figure 23:
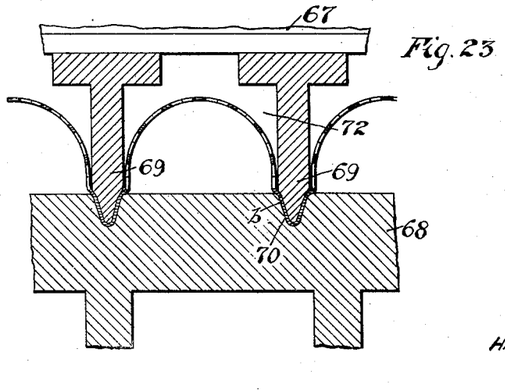
Figure 23 is a detail fragmentary cross sectional view to illustrate the action of the expansion guide.

From the last pair of expansion rolls the blank passes between a pair of ribbing rolls comprising (Figure 17) an upper roll 62 and a lower roll 63. The roll 62 is formed with peripheral ribs 64 and the roll 63 is formed with peripheral grooves 65 in which the ribs 64 operate. The ribs 64 engage in the beads $a$ and being deeper than the ribs of the beading rolls form said beads into comparatively deep ribs $b$. Between the ribs 64 the rolls 62 are provided with clearances 66 for the fully expanded slitted zones. The ribs 64 utilize the metal of the non-slitted portions which lies at the sides of the beads and form the beads into ribs by a shaping operation rather than by a stretching operation. In this action of the ribs 64 the edges of each expanded zone are drawn toward said ribs whereby a very slight initial spreading of the expanded zones is affected.

From the ribbing rolls the blank passes to means by which the slitted zones are flattened out, such means preferably being an expansion guide. The advantage of forming the ribs in the blank prior to its passage through the expansion guide is to insure more certain guiding cooperation between the blank and the expansion guide.

The expansion guide is shown in detail in Figures 18 to 23 and consists of cooperating upper and lower members 67 and 68 respectively. The member 67 is provided with guide ribs 69 arranged in flaring relation and the member 68 is provided with corresponding guide grooves 70. The ribs 69 are preferably parts of bars which are connected by cross pieces 71 and the member 68 is preferably in the form of a plate provided on its under side with supporting and re-enforcing ribs. The ribs $b$ of the expanded blank enter the grooves 70 and therein are engaged by the ribs 69 and the cross sectionally curved expanded portions enter the clearances 72 (Figure 23) between the ribs with the result that as the blank proceeds in its forward movement the ribs thereof are progressively more widely spaced from one another and the expanded portions are progressively altered in cross section from the arch or bow-shape cross section shown in Figures 17 and 28 to a substantially flat cross section as shown in Figure 29. From the expansion guide the flattened expanded blank passes to a pair of finishing rolls 73 and 74 (Figure 9). The roll 73 is provided with peripheral ribs 75 and the roll 74 is provided with corresponding peripheral grooves 76. The ribs of the blank enter the grooves 76 and therein are engaged by the ribs 75. The action of the rolls 73 and 74 is completely to straighten and smooth the ribs and to eliminate any roughness or inequalities in the surfaces of the expanded portions, thereby setting the strands and bonds and giving the expanded product a suitable finish.

The completely expanded product is sufficiently shown in Figure 30, is characterized by strands and bonds which are flat and coplanar in the plane of the sheet, and is of the same length as the blank.

The various rolls are preferably positively driven and are available, without the use of additional mechanism, for feeding the blank continuously through the equipment.

Having fully described my invention, I claim:

1. The method of expanding metal which includes the steps of slitting a blank to delimit strands and bonds in a portion to be expanded, holding the blank against lateral expansion at each side of said slitted portion, in a locally complete operation deflecting the bonds of a longitudinal row from the plane of the blank while holding the contiguous rows against deflection and bending the deflected bonds into regularly curved cross sections to bend the strands of each row adjacent said bonds into a plane at an angle to the plane of the blank and to said bonds to stretch the strands between said bonds and said contiguous rows in the planes into which they are bent by the deflection of the bonds.

2. The method of expanding metal which consists in slitting a blank to delimit strands and bonds in a portion to be expanded, holding the blank against lateral expansion at each side of said slitted portion, in a locally complete operation deflecting the bonds of a longitudinal row from the plane of the blank while holding contiguous rows against deflection and bending the deflected bonds into regularly curved cross sections to bend the strands of each row adjacent said bonds into a plane at an angle to the plane of the blank and to said bonds to stretch the strands between said bonds and said contiguous rows in the planes into which they are bent by the deflection of the bonds and thereafter increasing the mutual spacing of the rows at each side of the expanded portion whereby to flatten the expanded portion into the plane with which the operation started with the stretched strands and associated bonds lying flat in such plane.

3. The method of expanding metal which includes the steps of slitting a blank to delimit strands and bonds in a portion to be expanded, holding the blank against lateral expansion at each side of said portion, deflecting the bonds of the row extending along the center of said portion from the original plane of the blank and giving said deflected bonds a curved cross section while holding the contiguous rows of bonds against deflection, thereby in a single locally complete operation to bend the strands of each row adjacent said deflected bonds into a plane at an angle to the plane of the blank and to said bonds and at the same time to stretch said strands in the planes into which they are bent by the deflection of the bonds and in a similar operation further deflecting the previously stretched bonds and strands without further stretching while conditioning for expansion successive adjacent increments of the slitted portion at the same time maintaining the previously expanded area in a regular curved cross section whereby successively to extend the deflection to the strands of the rows next adjoining the expanded area and to stretch the strands of each of said rows in a single locally complete operation in the manner above stated.

4. The method of expanding metal which consists in slitting a blank to delimit strands and bonds in a portion to be expanded, holding the blank against lateral expansion at each side of said portion, deflecting the bonds of the row extending along the center of said portion from the original plane of the blank and giving said deflected bonds a curved cross section while holding the contiguous rows of bonds against deflection, thereby in a single locally complete operation to bend the strands of each row adjacent said deflected bonds into a plane at an angle to the plane of the blank and to said bonds and at the same time to stretch said strands in the planes into which they are bent by the deflection of the bonds and in a similar operation further deflecting the previously stretched bonds and strands without further stretching while conditioning for expansion successive adjacent increments of the slitted portion at the same time maintaining the previously expanded area in a regular curved cross section whereby successively to extend the deflection to the strands of the rows next adjoining the expanded area and to stretch the strands of each of said rows in a single locally complete operation in the manner above stated and increasing the mutual spacing of the parts at each side of the expanded portion whereby to flatten the expanded portion into the plane with which the operation started with the stretched strands and associated bonds lying flat in such plane.

5. The method of making expanded metal lath which includes the steps of forming spaced parallel beads in a blank, slitting the blank in the areas between the beads to delimit strands and bonds in portions to be expanded and to leave non-slitted zones in which the beads are included, feeding the blank in the direction in which the beads extend and utilizing the beads to guide the blank while it is being fed and during the feeding of the blank expanding the slitted zones by holding the non-slitted zones against lateral expansion, deflecting the bonds of the row extending along the center of each slitted zone from the original plane of the blank and giving said deflected bonds a curved cross section while holding the contiguous rows of bonds against deflection, thereby in a single locally complete operation to bend the strands of each row adjacent said deflected bonds into a plane at an angle to the plane of the blank and to said bonds and at the same time to stretch said strands in the planes into which they are bent by the deflection of the bonds and in a similar operation further deflecting the previously stretched bonds and strands without further stretching while conditioning for expansion successive adjacent increments of the slitted portion at the same time maintaining the previously expanded areas in regular curved cross section whereby successively to extend the deflection to the strands of the rows next adjoining each expanded area and to stretch the strands of each of said rows in a single locally complete operation in the manner above stated.

6. The method of making expanded metal lath which consists in forming spaced parallel beads in a blank, slitting the blank in the areas between the beads to delimit strands and bonds in portions to be expanded and to lease non-slitted zones in which the beads are included, feeding the blank in the direction in which the beads extend, utilizing the beads to guide the blank while it is being fed, expanding the slitted zones during the feeding of the blank by holding the non-slitted zones against lateral expansion, deflecting the bonds of the row extending along the center of each slitted zone from the original plane of the blank and giving said deflected bonds a curved cross section while holding the contiguous rows of bonds against deflection, thereby in a single locally complete operation to bend the strands of each row adjacent said deflected bonds into a plane at an angle to the plane of the blank and to said bonds and at the same time to stretch said strands in the planes into which they are bent by the deflection of the bonds and in a similar operation further deflecting the previously stretched bonds and strands without further stretching while conditioning for expansion successive adjacent increments of the slitted portion at the same time maintaining the previously expanded areas in regular curved cross section whereby successively to extend the deflection to the strands of the rows next adjoining each expanded area and to stretch the strands of each of said rows in a single locally complete operation in the manner above stated and increasing the mutual spacing of the non-slitted zones whereby to flatten the expanded areas into the plane with which the operation started with the stretched strands and associated bonds lying flat in such plane.

7. The method of expanding metal which includes the steps of slitting a blank to delimit strands and bonds in a portion to be expanded, feeding the slitted blank and in continuous manner during such feeding of the blank expanding said portion by holding the blank against lateral expansion at each side of said portion, deflecting the bonds of the row extending along the center of said portion from the original plane of the blank and giving said deflected bonds a curved cross section while holding the contiguous rows of bonds against deflection, thereby in a single locally complete operation to bend the strands of each row adjacent said deflected bonds into a plane at an angle to the plane of the blank and to said bonds and at the same time to stretch said strands in the planes into which they are bent by the deflection of the bonds and in a similar operation further deflecting the previously stretched bonds and strands without further stretching while conditioning for expansion successive adjacent increments of the slitted portion at the same time maintaining the previously expanded area in a regular curved cross section whereby successively to extend the deflection to the strands of the rows next adjoining the expanded area and to stretch the strands of each of said rows in a single locally complete operation in the manner above stated.

In testimony whereof I affix my signature.

HARRY A. KESSLER.